United States Patent [19]

Stapler

[11] 4,030,359

[45] June 21, 1977

[54] OPEN STREAM VELOCITY PROBE AND METER

[76] Inventor: W. Mead Stapler, One Dey Lane, Riverdale, N.J. 07457

[22] Filed: Nov. 26, 1976

[21] Appl. No.: 745,472

[52] U.S. Cl. .............................................. 73/231 R
[51] Int. Cl.² ........................................ G01F 1/115
[58] Field of Search ................. 73/189, 231 R, 229

[56] References Cited

UNITED STATES PATENTS

| | | | |
|---|---|---|---|
| 1,593,291 | 7/1926 | Critchlow | 73/231 R X |
| 3,557,617 | 1/1971 | Wilson et al. | 73/189 X |

OTHER PUBLICATIONS

An Article, "Portable Propeller Flowmeter Determines Water Velocity" by Molyneux et al. from "Electronics", June 23, 1961 pp. 60, 62.

*Primary Examiner*—James J. Gill
*Attorney, Agent, or Firm*—Ralph R. Roberts

[57] ABSTRACT

This invention pertains to a flowmeter probe for measuring the rate of fluid flow in open streams or in and from the discharge ends of pipes. The probe apparatus includes a handle and a pivoted extension and shaft on whose distal end is mounted a turbine-type flowmeter. This flowmeter is protectively carried in a housing so that the turbine blades are protected by a shroud of a thin and close fitting construction and having a curved or chamfered entranceway to guide a full flow through the shroud. The head is selectively adjusted and clamped to the handle at any point within a 90° arc.

7 Claims, 9 Drawing Figures

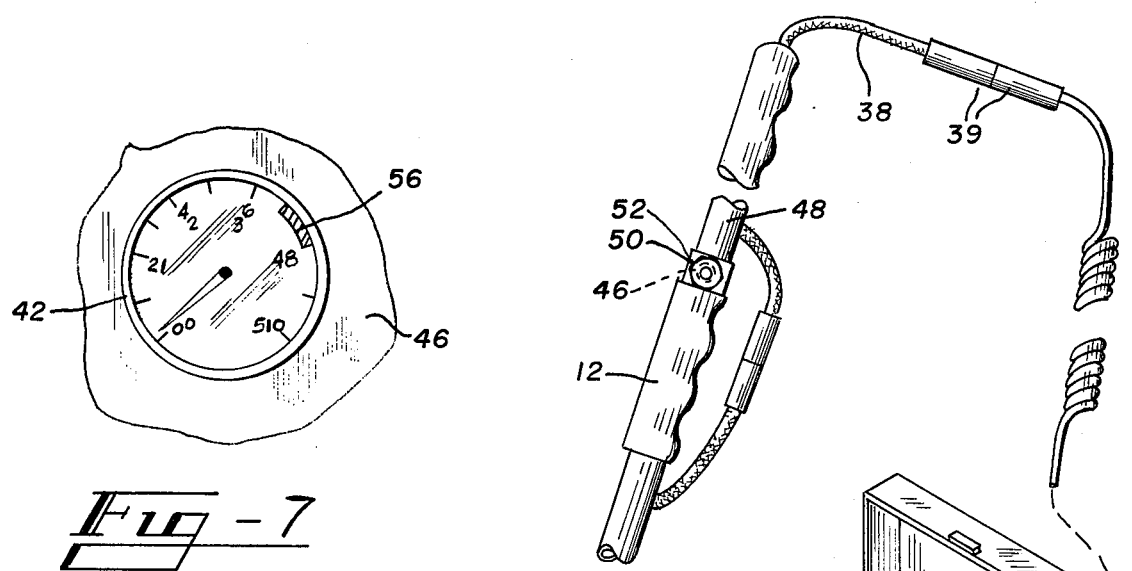
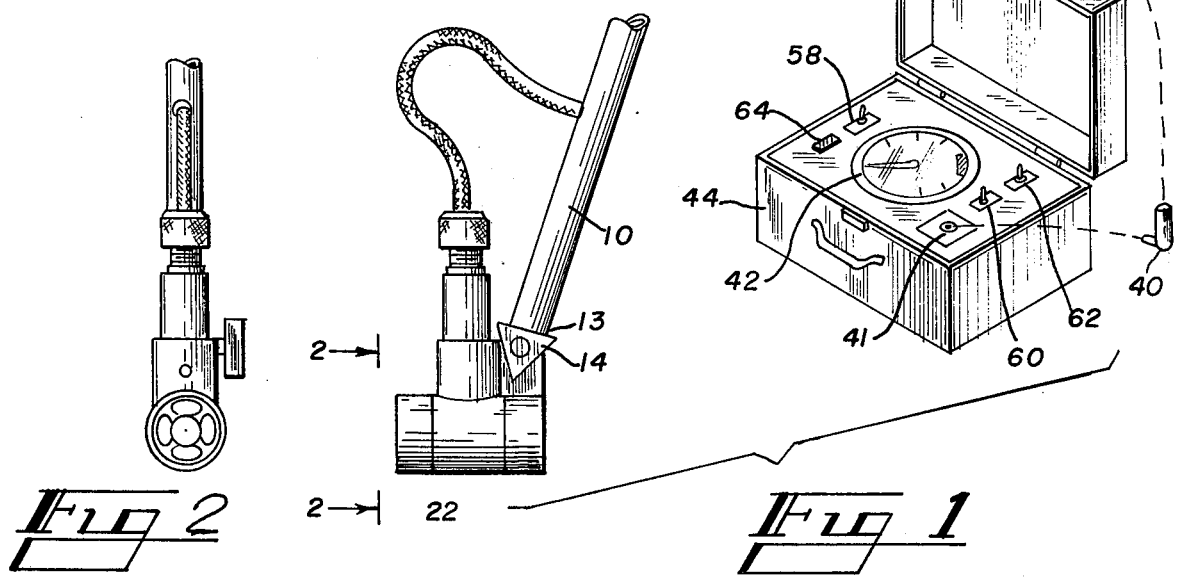
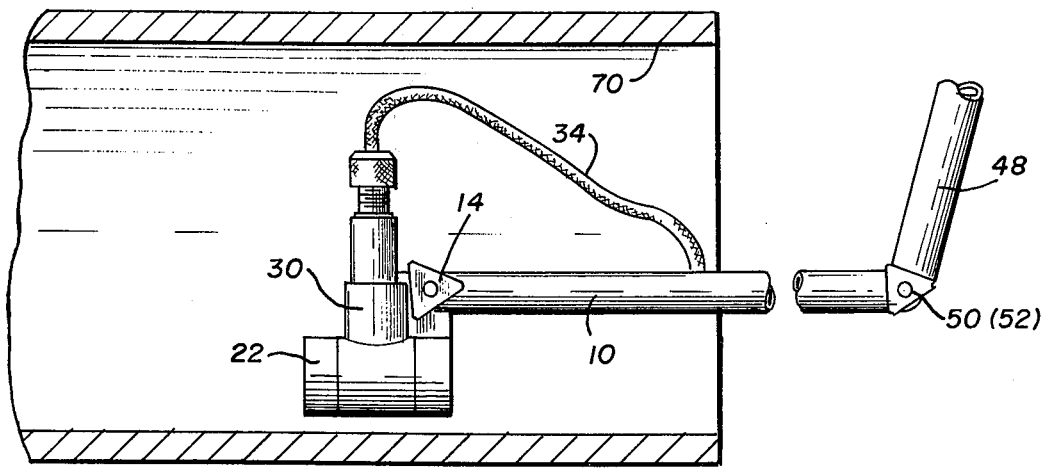

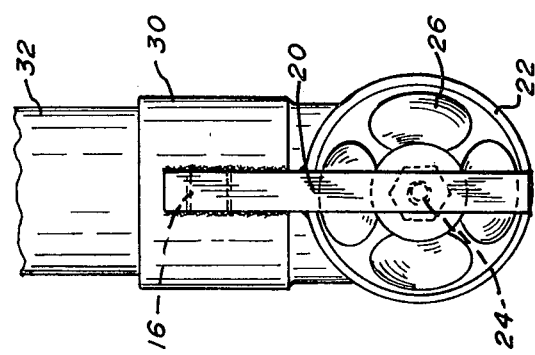
Fig-6
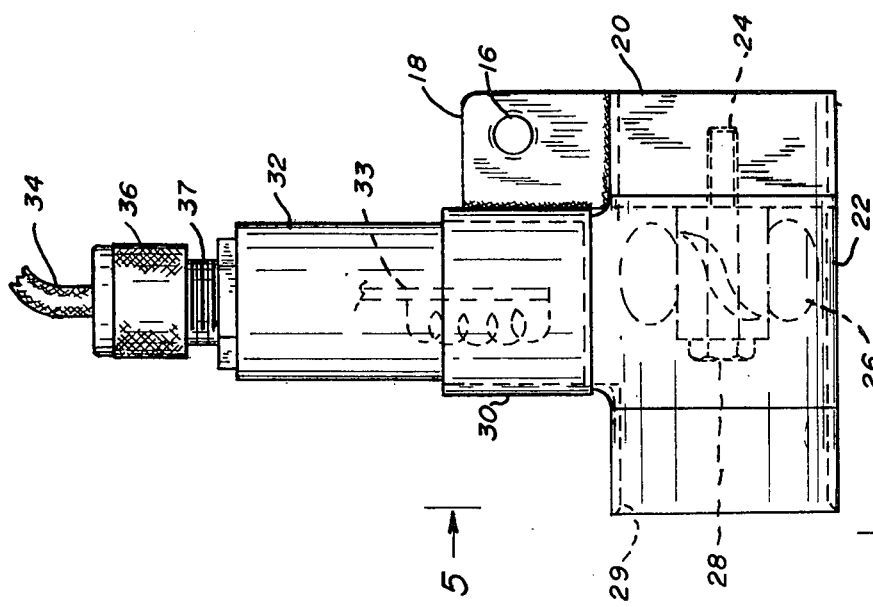
Fig-4
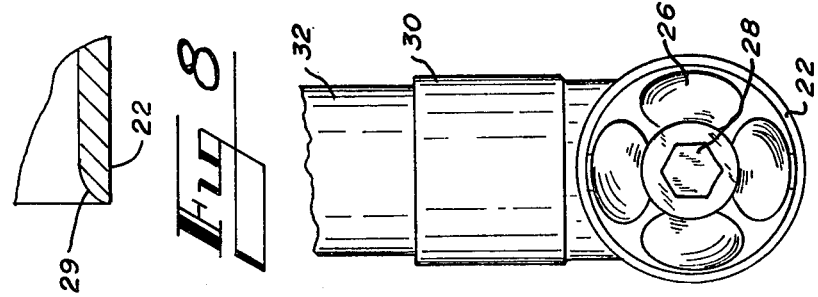
Fig-8
Fig-5

OPEN STREAM VELOCITY PROBE AND METER

BACKGROUND OF THE INVENTION

1. Field of the Invention

With reference to the classification of art as established by and in the United States Patent and Trademark Office this invention pertains to the general Class entitled, "Measuring and Testing" (Class 73) and in particular to the subclass thereunder entitled, "meterology and oceanology" (subclass 170) and the subclass thereunder "with velocity determination" (subclass 189). Also noted in this class is the subclass entitled, "volume or rate of flowmeter" (subclass 194) and the subclasses thereunder entitled, "turbine-type" (subclass 229) "and with mass flow measuring" (subclass 231M).

DESCRIPTION OF THE PRIOR ART

In particular this invention is an improvement or an adaptation of several of the improvements of a flowmeter such as is shown in my U.S. Pat. No. 3,771,363 which issued on Nov. 13th, 1975 and is entitled, "Turbine-Type Flow Responsive Device." In this and in most of the turbine-type flowmeters, the apparatus is specifically designed for mounting in a fixed relation to a fluid flow path such as in a pipe or the like. It is also known that there is a need for apparatus enabling hydrological estimates to be established. These estimates closely determine the rate of flow of streams and/or output discharges from pipes which, for example, carry sewage and/or by-products of manufacturing processes. For many reasons it is desired and required that the amount of flow in the streams or pipes be measured with accuracy. Since the measuring equipment for this type of exploration and determination must be portable I have provided a velocity indicator using the principles of the turbine-type flowmeter probe of my above-identified patent.

Examples of prior patents pertaining to flow motion and open stream measurement include U.S. Pat. No. 3,610,039 to ALTHOUSE as issued on Oct. 5th, 1971, U.S. Pat. No. 3,633,417 to MONTAGUE as issued on Jan. 11th, 1972 and in particular U.S. Pat. No. 3,433,070 to GRIMALDI as issued on Mar. 18th, 1969 as well as U.S. Pat. No. 3,076,334 to WILEY as issued on Feb. 5th, 1963. The GRIMALDI patent is an example of the most common, commercially available flowmeter probe. The open impeller 10 is subject to damage and there is no shroud by which the path of maximum flow can be determined. In any and all such devices it is required that the flowmeter probe be accurately positioned although hand held. The present invention provides a turbine-type flowmeter such as is seen in my above-identified patent with the turbine blades carried in a protective shroud so that they cannot be externally damaged during the manipulation for the desired placement into a stream or into a pipe. The shroud also enables the turbine to be oriented in the flow by the operator so that by reading a meter the observer can determine the precise direction of flow and record the rate of flow of current of the fluid being measured.

SUMMARY OF THE INVENTION

This invention may be summarized at least in part with reference to its objects. It is an object of this invention to provide, and it does provide, an open stream velocity probe employing a turbine-type inductive mechanism driven by the velocity of the flow being measured. This turbine is carried by a housing and the blades thereof are in a close fitting and thin shroud. The housing is pivotally mounted on a handle or stick and means is provided so that the housing may be selectively clamped at a position at right angles to the probe handle or parallel to the probe handle or at any place in the ninety degrees therebetween.

In the apparatus, to be hereinafter more fully described, the turbine-type flowmeter is carried by a housing having a shroud of determined size which protects the four blades of the turbine. The turbine blade unit is adapted to provide an electrical pulse with each rotation, this pulse is received by an inductive coil and translated to a meter for reading by the operator in a manner as described in my above-reference patent. The shroud and housing are formed with one-half of a pivot connection for mounting to a handle of determined length. The other half of the pivot connection is on the distal end of the handle which is a hollow tube. This handle carries within a portion of its length a conductor by which pulses from the inductive coil are led as a developed current to a readout device having a meter-type indicator producing a reading which is instantaneous and accurate.

The embodiment, to be hereinafter more fully described, employs a shroud that is thin and close fitting. In the preferred reduced-to-practice apparatus the shroud has a one-sixteenth of an inch wall thickness and the clearance of the four-bladed turbine with the inside of the shroud is also about one-sixteenth of an inch. The outer diameter of the shroud is one and one-half inches although a diameter of up to two inches may be used in certain circumstances. This small size is desirable for portability and for use in shallow streams and small discharge pipes. The chamfered end at the inlet end of the shroud insures that a full flow through the shroud is measured. The additional handle and its manipulative arrangement and the test for battery power availability as provided by and with the present apparatus insures that the probe readings are accurately made.

In addition to the above summary the following disclosure is detailed to insure adequacy and aid in understanding of the invention. This disclosure, however, is not intended to prejudice that purpose of a patent which is to cover each new inventive concept therein no matter how it may later be disguised by variations in form or additions of further improvements. For this reason there has been chosen a specific embodiment of the open stream velocity probe as adopted for use in streams and pipes and showing a preferred embodiment thereof. This specific embodiment is shown in the accompanying drawings wherein:

BRIEF DESCRIPTION OF THE DRAWINGS

FIG. 1 represents a more-or-less pictorial arrangement of the apparatus and including the electronic meter amplifier and associated instruments which enable the operator to take an instant reading of the flow of the turbine and showing an additional handle and a battery test on the meter showing the velocity reading;

FIG. 2 represents an end view looking into the turbine portion of the probe, this view taken on the line 2—2 of FIG. 1 and looking in the direction of the arrows;

FIG. 3 represents in an enlarged scale a sectional view of a conduit or pipe with the probe end containing the turbine inserted into said pipe and as depicted the axis of the lower handle portion is in alignment with the turbine and a pivoted handle extension arranged for grasping at a convenient position above the pipe or conduit, the shroud enclosed turbine being immersed in the flow in the pipe;

FIG. 4 represents an enlarged side view, partly schematic and showing a more detailed construction of the housing, the turbine and shroud of the apparatus of FIG. 1, the entrance end of the shroud showing the chamfer by which the flow to and through the shroud is brought to a maximum efficiency;

FIG. 5 represents an end view of the turbine end of the probe end of FIG. 4, this view taken on the line 5—5 of FIG. 4 and looking in the direction of the arrows;

FIG. 6 represents an end view looking from the downstream end of the probe and toward the turbine, this view being taken on the line 6—6 of FIG. 4 and looking in the direction of the arrows;

FIG. 7 represents a plan view in an enlarged scale of the meter case and showing in particular the battery test switch and meter reading therefor and the operating indicating light, operation switch and the high and low operating switch;

FIG. 8 represents in an enlarged view the curved chamfer formed on the inlet end of the shroud for the turbine.

Figure 9:
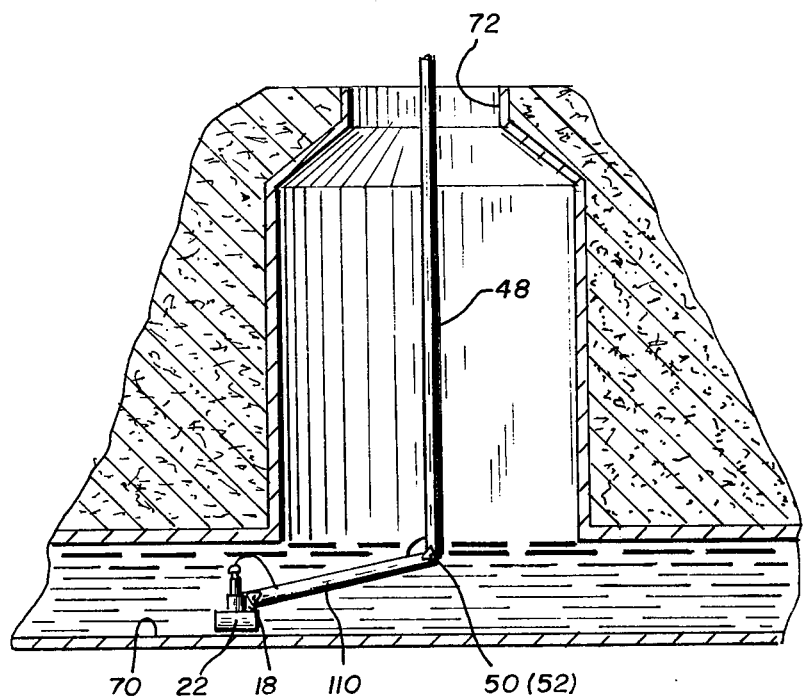
FIG. 9 represents a diagrammatic side view of the flow meter probe as used in a sewer having a manhole and with a handle extension allowing the operator to place the probe in a stream flow in a pipe while standing at street level.

In the following description and in the claims various details are identified by specific names for convenience; these names, however, are intended to be generic in their application. Corresponding reference characters refer to like members throughout the several figures of the three sheets of drawings.

The drawings accompanying, and forming part of, this specification disclose details of construction for the purpose of explanation of the broader aspects of the invention, but it should be understood that structural details may be modified and may be incorporated in other structural forms than shown.

DESCRIPTION OF THE EMBODIMENT OF FIGS. 1–9

Referring now to the drawings and the embodiment shown therein the open stream velocity probe includes an aluminum short tubing handle 10 whose upper end may have a hand grip portion 12 which may be molded out of plastic or the like. This hand grip is designed for comfort in grasping as well as enabling a positive control of the probe to be achieved. Positive control is desired to maintain an orienting of the probe in the desired position. The distal or lower end of the tubing 10 is flattened and shaped to provide a lap end 13 which end has a bolt hole therein through which is fed a threaded shank. On this threaded shank is a tightening knob 14. This tightening knob turns the threaded bolt which passes through the flattened end on the end of the handle 10 and into a threaded hole 16 in a rib extension 18 which is an upward continuation of a rib 20 which extends downwardly the full extent of the back of a shroud 22. Shroud 22 is a tubular member of small diameter such as one and one-half to two inches in diameter and having a wall thickness of one-sixteenth of an inch which is of metal sufficient to withstand small blows without deforming.

A threaded aperture 24 is formed in rib 20 and has its axis substantially in coincidence with the axis of shroud 22. A turbine rotor 26 is rotatably carried on a cap screw 28 mounted in the threaded aperture 24 and as thus disposed the rotor is centrally positioned in the shroud. The cap screw 28 provides not only the means for retaining the turbine in a desired position but also acts as the shaft upon which the turbine rotates. The turbine 28 is made so as to have about one-sixteenth of an inch clearance between the sweep of the blades and the inside of the shroud. The forward entrance end of the shroud 22 has a chamfer or radius 29 which forms an inturning guide for the flow of fluid.

A threaded collar portion 30 extending upwardly from shroud 22 is adapted to receive a housing nipple 32 in which is carried the induction transducer 33 which generates and feeds the produced electrical signals to and through a flexible conductor 34. The conductor is maintained in position by means of a nut 36 fitted to a compression fitting 37 at the upper end of the housing portion 32. The compression fitting is a fluid seal as well insuring that the interior of nipple 32 and the components therein do not receive water or other unwanted fluid.

Referring again to FIG. 1, it is to be noted that the complete probe includes a second conductor 38 which is an extension of the handle contained conductor 34. A connector 39 enables the two conductors to be conductively joined with the conductor 38 being of a predetermined length. A male end 40 on the end of conductor 38 is insertable into female socket 41. A meter 42 is carried by a housing 44 which contains the amplifier, solid state circuitry, battery power elements and switches needed to activate the circuit.

The end of the handle 10 has an aperture 46 which receives and retains a handle extension 48. A bolt and nut 50 and 52 secures the extension 48 to the end of the handle in a selectively pivoted manner. The use of this extension enables the user to be above the outlet of a pipe in which the flow is to be measured. The same extension may be used when the operator is to be some distance from a stream whose flow is to be measured.

The housing 44 carries a meter 42 which has a scale portion 56 which is adapted to indicate when a satisfactory level of power is available in the enclosed batteries when a test switch 58 is moved to an on condition. This switch 58 is a momentary on switch that is moved to an off condition by self-contained spring means when the switch is not physically moved to and held in an on condition. A switch 60 is movable to an on or off condition and is actuated to turn the apparatus on. A switch 62 is connected to a resistance means so that the meter 42 will give two levels of readings in response to the impulses produced by the turning of the turbine. An indicator light 64 is lighted when the switch 60 is moved to the operating on condition.

USE AND OPERATION OF THE PROBE

When an open stream or a conduit is to have the velocity of the stream flow measured the operator of the unit connects conductors 34 and 38 at connector 39 and inserts end 40 into the socket 41 of the reading apparatus in housing 44. The cover of the housing is opened so that meter 42 may be viewed. The battery may be tested by manipulating the test switch 58. If satisfactory, the switch 60 is turned to the on condition which is indicated by the light 64. Depending upon the velocity reading to be achieved the meter is read on the high or low scale as provided by switch 62. The shroud is now arranged for placement in the stream or pipe. The handle 10 and extension 48 are adjusted to provide ease of manipulation and meter reading. The activated electronic circuitry and the pulses provided by the transducer 33 is read on the meter 42. This meter is actuated by a signal which is amplified by a solid state or like circuitry within the housing or case 44. As reduced to practice, the meter and switches provided with the circuitry enable a single or a dual range to be read on the meter. In general, a water rate of up to fifteen feet per second water velocity is able to be read on the meter. The lowest point of readable operation of the velocity probe is approximately one-quarter foot per second for all ranges of this scale.

The operator of the equipment surveys the stream flow arrangement and by manipulating the hand knob 14 loosens the lap joint to move the shroud 22 to the desired orientation in relation to the handle 10. Nut 14 is then tightened to retain the shroud housing 22 in the selected orientation with the handle 10. The operator then places the shroud end with the enclosed turbine into the stream or flow being measured. The operator moves and turns the shroud so that the axis of the turbine shaft is aligned with the maximum flow of the stream or pipe. This is readily determined by a slight amount of rotation and by moving the turbine head in the stream flow until the operator finds the maximum flow by observing the readings on the meter. When it is desired or required to read the flow in a pipe such as a discharge pipe 70, as seen in FIG. 3, the knob 14 is turned to loosen the adjusting joint so that the handle 10 may be moved and brought into alignment or substantially into alignment with the axis of the turbine 26. When this orientation is achieved the knob 14 is turned to tighten the joint and retain the shroud 22 in the selected orientation after which the operator inserts the turbine head into the stream in the pipe to measure the rate of flow of this stream.

In the open stream or in a pipe the rotation of the turbine causes the electric pulses as developed to be fed to the read-out device. The meter 42 gives a reading which is instantaneous and accurate. No counters, timers or lengthy test periods are required. All readings are direct and may be made by any attendant. The turbine rotor consists primarily of a low inertia turbine wheel of Delrin (Trademark of DuPont) mounted in a protective shroud at the end of the aluminum handle 10. The turbine when immersed in a flowing stream rotates at a speed which is in direct linear relationship to the fluid velocity of the stream. For each rotation of the turbine a small magnet sealed within the turbine hub produces an electrical pulse in the adjacent induction transducer 33. The frequency of these pulses is measured as a direct indication of the fluid velocity. Not shown is a conventional solid state control and amplification system which is carried in case 44 and is made so as to be able to withstand rough treatment. Primarily the measurements provided by this probe enable industrial and municiple pollution control experts to enter streams or rivers and measure the stream velocity for flood control, flow patterns in filter beds or even the flow out of large pipes or ducts. The adjustable head also allows insertion into pipe ends for vertical velocity measurements. The ninety degree adjustment provided by the above disclosed embodiment permits alignment of the turbine with any stream flow from any operator holding position.

PROBE AS IN FIG. 9

Referring finally to FIG. 9, there is shown the probe as used to measure fluid flow in a sewer 70. A short handle 110 is secured to the extension 18 and in the manner of FIG. 3 the shroud portion 22 is secured at a small angle to the handle 110. The handle extension 48 is pivotally mounted on the end of the handle 110, and by tightening the bolt and nut 50 and 52 is retained at the indicated angle. At the open manhole 72 at street level the operator may stand and through this hole manipulate the probe to give a maximum reading of the flow. This auxiliary handle 48 in combination with the short handle 110 provides a convenience for the operator who can position himself remotely from the shroud while placing the probe in pipes, flow units such as sewers and on the banks while measuring the flow in open streams.

The handle extension permits the user of the apparatus to conveniently extend the probe into the end of pipes especially those carrying chemicals and sewage. The small diameter of the probe housing enables the probe to be used in a small pipe and/or shallow stream. The light weight of the head, turbine handle and extensions permit extended usage without undue fatigue. The equipment is particularly portable both in a disassembled condition and in an assembled condition. The head and shroud are easily moved to the desired orientation because of their small size and light weight.

The open stream velocity probe, above-described, may be modified to a certain extent and still provide essentially the same functional operation. For example, the turbine may have more or less blades. The turbine shaft may be supported at both ends or the turbine may have forward and rear blade members and the shaft supported therebetween. The pivoted support of the housng on the end of the handle may be a ball and socket or some other known construction which provides at least a ninety degree movement and a clamping of the adjustment anywhere within this range. The ease of use and the versatility of the probe is a very satisfactory answer to the present day demand for easy and accurate stream velocity measurement in pollution control.

An alternate to the above-described apparatus has the coil 33 potted in silastic. A rubber strain relief may then be used on the cable 34 instead of the fitting 36. A set screw through the rib extension 18 is adapted to hold the potted coil 33 in the portion 30. This arrangement reduces the overall extension or height of the portion 30 from the shroud and allows use of the probe in smaller pipes.

Terms such as "front," "back," "in," "out" and the like are applicable to the embodiment shown and described in conjunction with the drawings. These terms are merely for the purposes of description and do not necessarily apply to the position in which the velocity probe may be constructed or used.

While a particular embodiment of the probe has been shown and described it is to be understood the invention is not limited thereto and protection is sought to the broadest extent the prior art allows.

What is claimed is:

1. A flowmeter probe apparatus in which the probe is of a relatively small size and weight enabling hand holding and manipulation, said probe providing means for measuring the rate of fluid flow in open streams, discharge ends of pipes and the like, said probe apparatus including: (a) a turbine-type flowmeter in which a rotatable turbine has blades mounted thereon; (b) a housing in which the turbine is carried, this housing including a tubular shroud of not more than two inches in diameter and arranged so as to surround the tips of the rotatable turbine blades in a close proximity thereto and providing a clearance of not greater than one-eighth of an inch and to provide protection for said blades against accidental engagement of these blades with rocks, weeds, obstructions, walls of pipe and the like, said shroud having an inlet chamfer adapted to guide the influent in way of the wall of the shroud to the interior of the shroud; (c) a magnet carried by the turbine and producing in an induction transducer carried in the housing at least one pulse with every revolution of the turbine, this pulse carried by a cable to an amplifier and meter retained in a portable remote housing; (d) a pivot joint member formed on said housing; (e) a handle having a pivot mounting means on one end for the mounting thereon of the housing and a handle grip at the other end and a handle extension attachment means, the pivot mounting adapted for cooperative engagement with the pivot joint member on the housing; (f) means for locking and unlocking the pivot joint so that the housing may be moved and clamped at any position between alignment with the handle and at a position normal to the axis of the handle and when the housing is aligned with the handle placement of the probe into the ends of small discharge pipes may be achieved, and (g) a handle extension means pivotally attachable to the end of the handle enabling the housing and shroud to be inserted into a pipe while the operator stands above the pipe.

2. A flowmeter probe as in claim 1 in which the pivot joint includes a rib portion on the housing and a compatible flattened portion is formed on the end of the handle and there is provided a threaded bolt and hand knob used with at least one hole and a threaded member to loosen and tighten the joint at the selected angle of the housing to the handle.

3. A flowmeter probe as in claim 1 in which the induction transducer is carried in the housing and a substantial portion of the cable is carried by the handle.

4. A flowmeter probe as in claim 3 in which the handle is substantially hollow and a large portion of the cable is carried in this hollow portion.

5. A flowmeter probe as in claim 3 in which the cable is connected to the amplifier by means of a selectively separable connecting means.

6. A flowmeter probe as in claim 1 in which the remote housing that contains the meter also contains a battery power source and a test circuit actuated by a switch means by which the available level of battery power is indicated on the meter that indicates the flow.

7. A flowmeter probe as in claim 6 in which an additional switch means is provided and is actuated to provide battery power to the electronic circuit and there is a light bulb means which is lighted when the battery power is operatively connected to the battery source.

* * * * *